May 16, 1933.  E. P. BURRELL  1,909,165
HYDRAULIC OPERATING SYSTEM FOR MACHINE TOOLS
Filed Nov. 26, 1930  6 Sheets-Sheet 1

Patented May 16, 1933

1,909,165

UNITED STATES PATENT OFFICE

EDWARD P. BURRELL, OF SHAKER HEIGHTS, OHIO, ASSIGNOR TO THE WARNER & SWASEY COMPANY, OF CLEVELAND, OHIO, A CORPORATION OF OHIO

HYDRAULIC OPERATING SYSTEM FOR MACHINE TOOLS

Application filed November 26, 1930. Serial No. 498,391.

This invention relates to a hydraulic control system for machine tools. More particularly, it relates to a hydraulic operating system for machine tools having a movable member whose rate of movement is to be accurately controlled at least for a portion of its complete cycle of movement.

The invention finds particular utility in connection with machine tools, such as lathes, wherein the movable member is a tool or work holding slide which is movable in opposite directions, a member of this kind being usually given a rapid forward movement, then a relatively slow feeding movement, and then a rapid return movement.

The principal object of the present invention is to provide an improved hydraulic actuating system for the movable member of a machine tool whose movement is to be controlled, together with control means for insuring a constant movement during the feed or relatively slow movement when the cutting operation takes place, regardless of the variable leakage factor in the hydraulic system, or other factors which might tend to cause an irregular movement.

Further objects are to provide, in association with the control means referred to above, means for providing full automatic operation, including the automatic changes in speed or rate of movement and the reversal of movement with a predetermined but variable dwell period between the end of the feeding movement and the rapid reverse or return movement, and suitable provision for allowing the hydraulically actuated member to make a predetermined number of complete cycles of movement and then to be stopped to permit the finished work piece to be removed and another work piece to be loaded on the machine.

The above and other objects are attained by the present invention which may be here briefly summarized as consisting in certain novel combinations and arrangements of parts and details of construction which will be described in the specification and set forth in the appended claims.

My control system may be used to advantage with many different kinds of machine tools, but a particularly important field of use includes machine tools having a reciprocating tool or work holding member which is usually given a relatively slow feeding movement which must be of a constant nature regardless of leakage and regardless of varying pressures on the sliding member by the action of the tool or tools on the work and which is designed to have a relatively fast rate of movement in a forward direction up to the point where the tool or tools engage the work and a similar relatively high rate of movement on the return stroke following the cutting operation or operations. Accordingly, I have illustrated my invention applied to such a machine tool, the particular tool being a turret lathe and the hydraulically operated reciprocating member being in this instance a turret slide, but it is to be understood that in so illustrating the invention I do not limit any part or all of the novel features to a machine tool of this type.

In the accompanying drawings.

Referring now to the drawings, the machine tool or lathe here illustrated is provided with a bed 15 having ways 16 on which the hydraulically actuated sliding member, in this instance in the form of a tool supporting turret slide 17, is mounted, this slide being movable toward and from the head 18 having a work spindle 19 which in this instance supports and rotates the work. In some cases, the work piece is supported in the sliding member and the tool or tools in the relatively stationary member in so far as longitudinal movement is concerned, and of course the invention is equally applicable to that type of machine tool.

In a machine of the type herein illustrated, provided with a turret slide 17 having a tool holding turret 20, the tools are adapted to be mounted on several faces of the turret here illustrated as five in number, the tools being caused to successively operate on the work and each cycle of movement including a rapid forward movement to bring the tool adjacent the work, then a relatively slow feeding movement for the cutting operation, then the stopping of the slide followed by a predetermined dwell of the tool at the completion of the cut, and then a relatively rapid return movement back to the point where the cycle is to be repeated. Near the end of the return movement, the turret is indexed, in this instance being moved through one-fifth of a revolution so as to properly position the tool which is supported on the next or adjacent face of the turret and which operates during the next cycle of operations.

Many of the parts of the lathe may be of standard construction. For example, the work spindle may be rotated at any one of a plurality of speeds by standard multiple speed gearing, usually contained in the head of a machine of this kind and driven from any suitable source of power, such as an electric motor or pulley and driving belt. Likewise, the indexing mechanism for the turret may be of any of the usual standard forms employed in the customary mechanically operated turret lathes wherein the turret indexing takes place automatically during the latter portion of the return movement of the turret slide with any of the usual turret clamping or locking devices. As these are standard in machines of this kind, they are not herein illustrated.

As before stated, the turret slide 17 of this machine is moved back and forth over the ways 16 hydraulically and by this is meant, of course, by means of a suitable relatively movable cylinder and piston and suitable actuating fluid, generally a special oil, which is supplied through a valve to either side of the piston by a pump which may be of any of the standard forms employed in hydraulic operating systems of this general character. Of course, any suitable pump which supplies the fluid at the desired constant pressure may be utilized, which pump will have the usual relief valve which will act at any predetermined pressure. The pump itself and the relief valve are not herein illustrated but the connections will be referred to presently.

Figure 1:
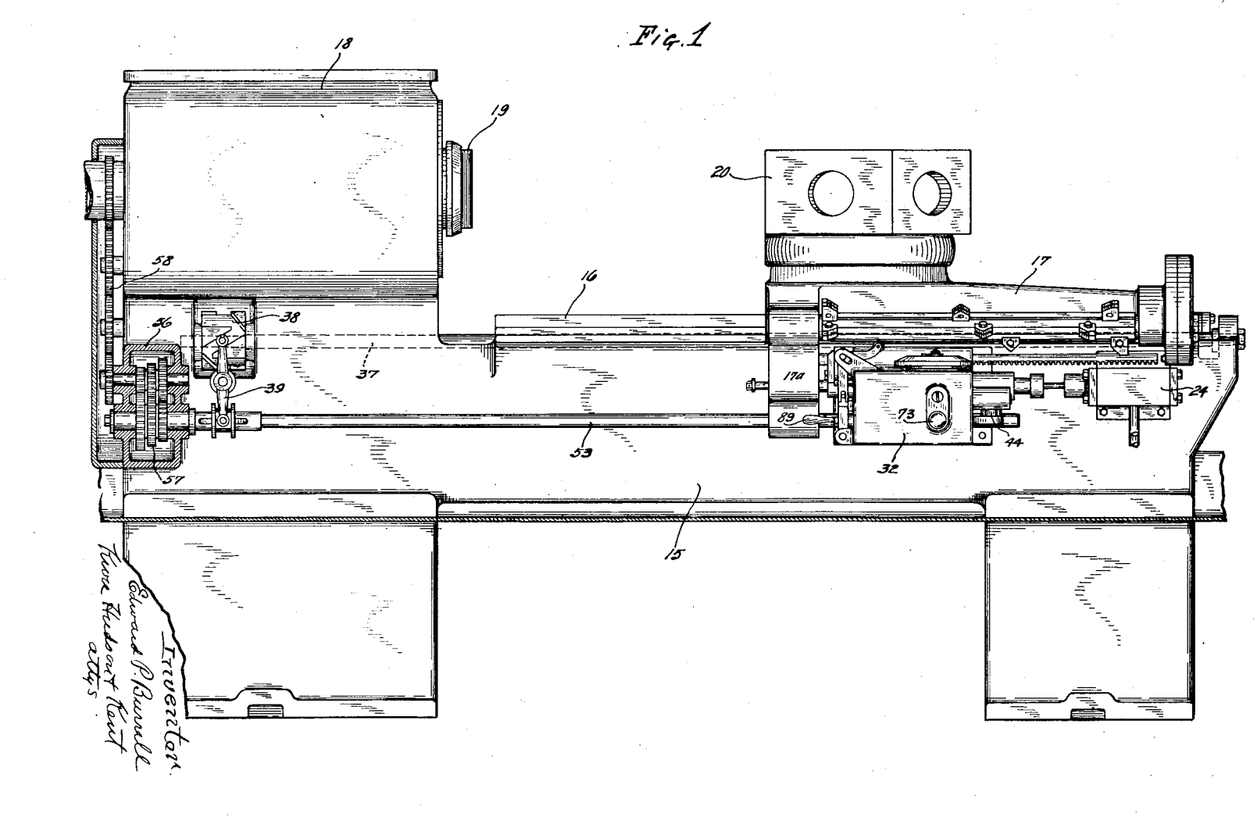
Fig. 1 is a side elevation of a turret lathe equipped with my invention.
Figure 2:
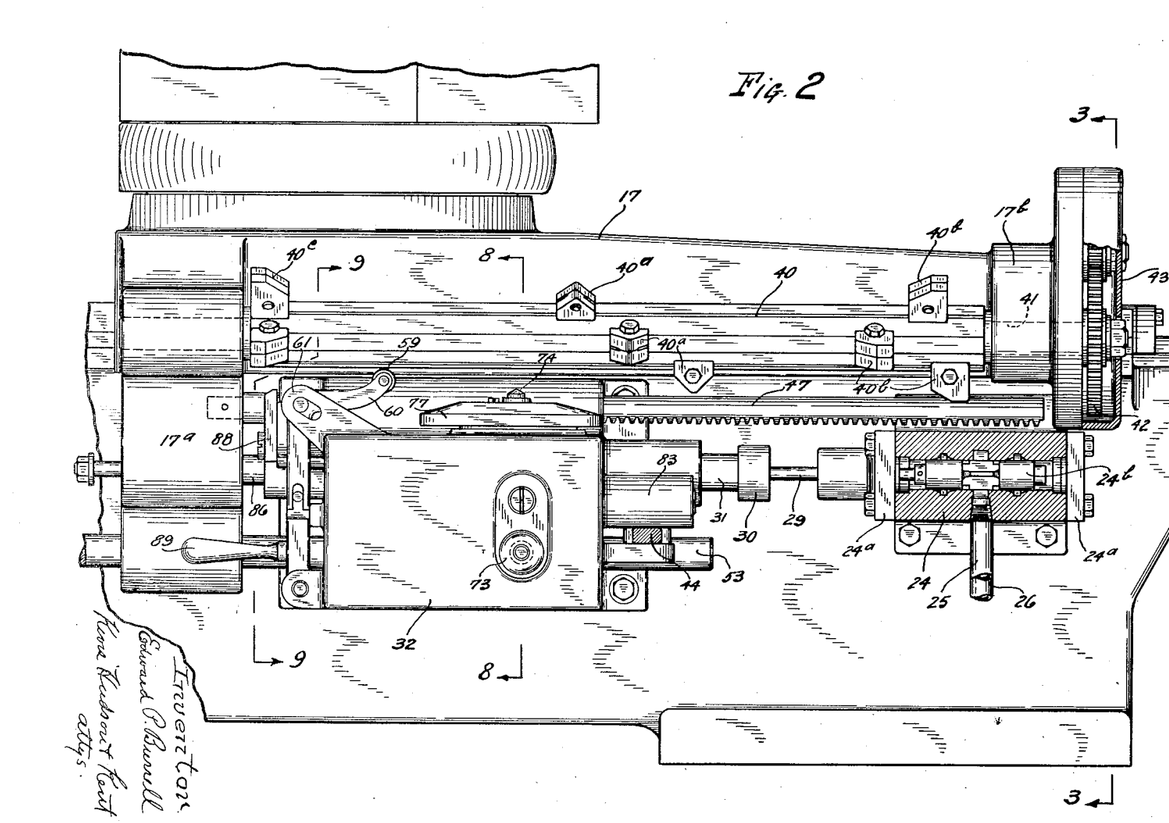
Fig. 2 is an enlarged side elevation of that part of the lathe which appears at the right-hand end of Fig. 1, with certain parts in section.
Figures 3, 10:
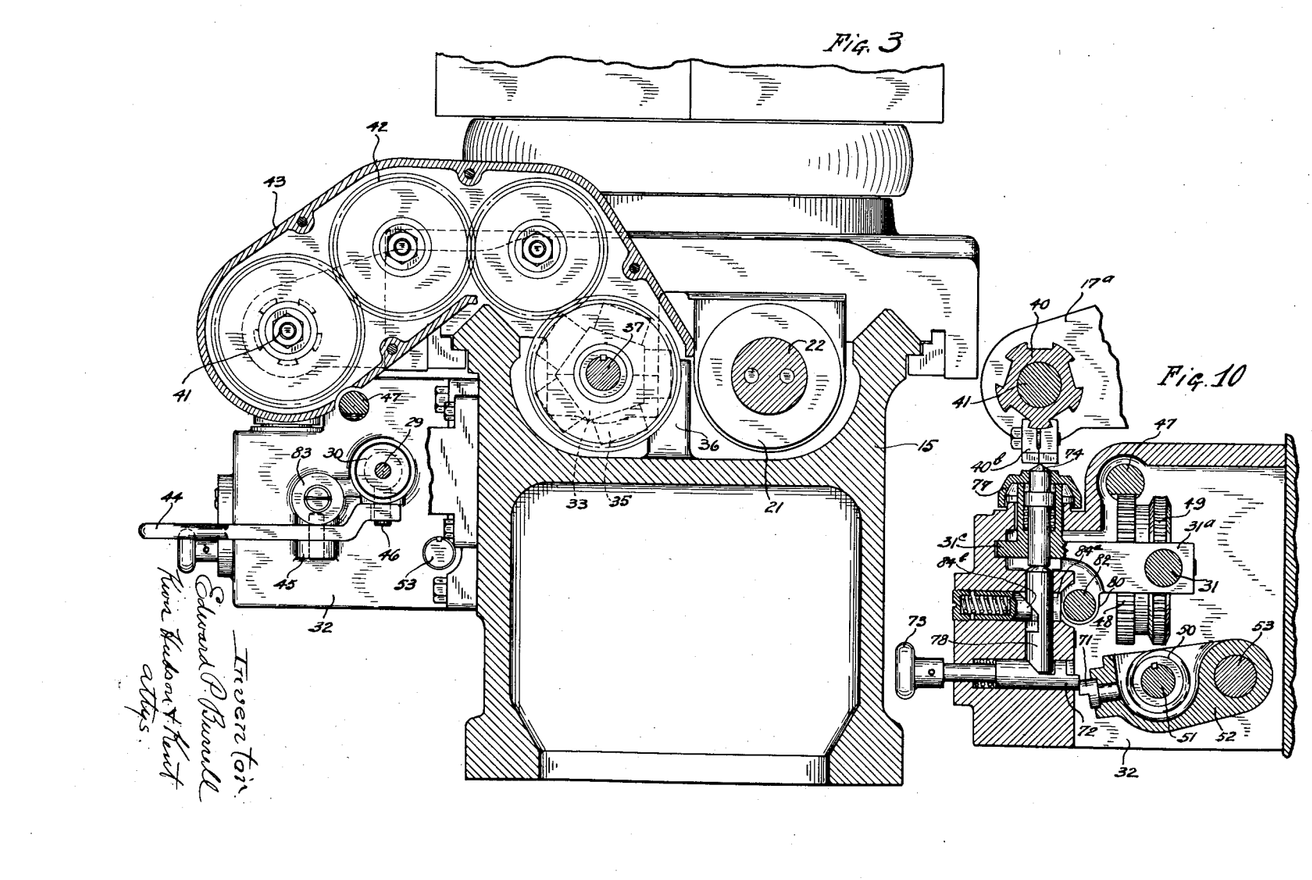
Fig. 3 is a transverse sectional view substantially along the line 3—3 of Fig. 2, with the major portion of the control valve removed.
Fig. 10 is a view similar to Fig. 8 but showing the parts in a different position.
Figure 4:
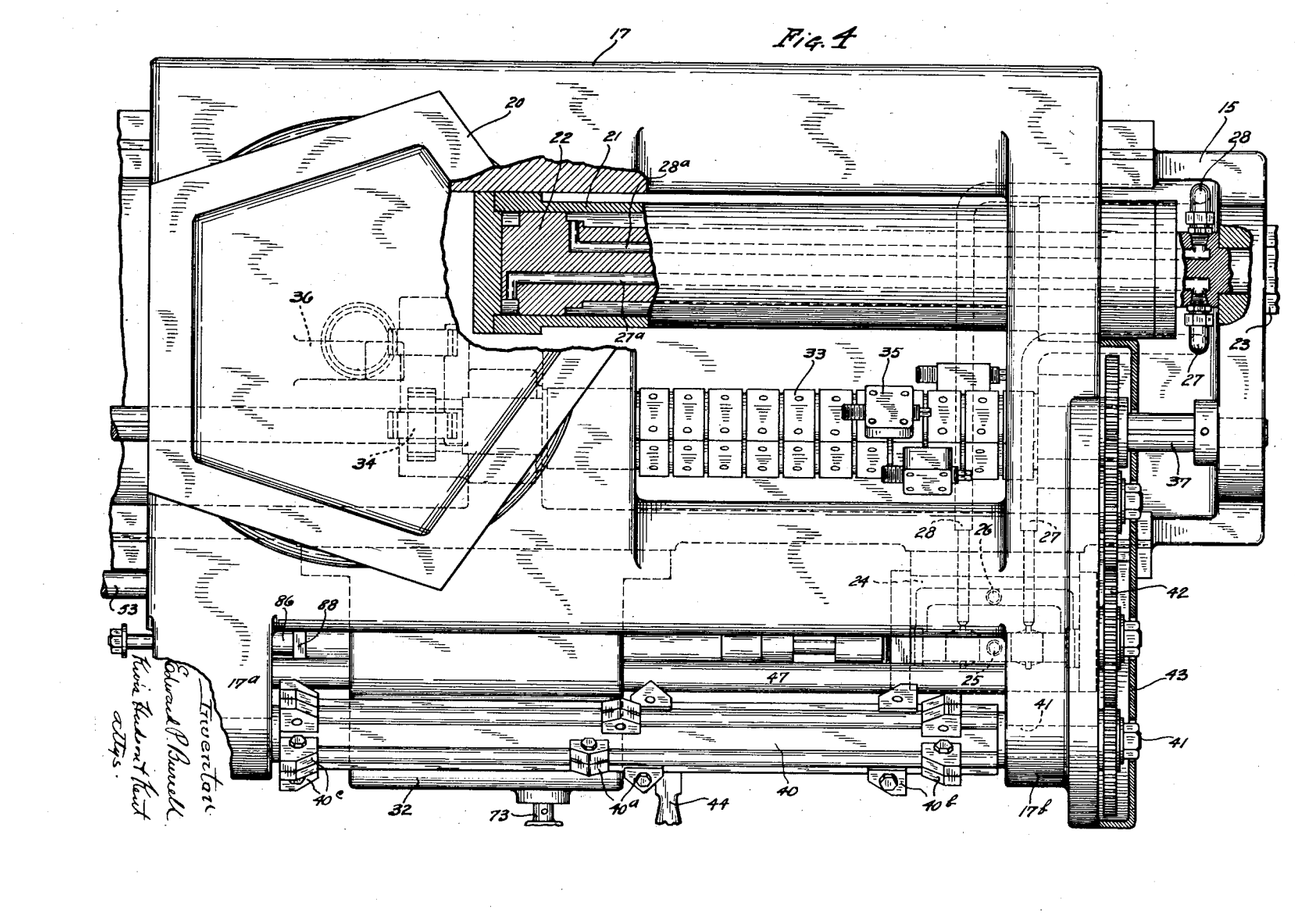
Fig. 4 is a top plan view of the structure shown in Fig. 2, with certain parts in section.

In this instance the cylinder 21 and the piston and piston rod 22 which actuate the turret slide 17 are mounted in the bed 15 (note particularly Figs. 3 and 4). For convenience, the cylinder 21 is attached in any suitable manner to the lower side of the turret slide and the piston and piston rod are stationary, Fig. 4 showing the end of the piston rod 22 suitably secured at 23 in the rear end of the bed 15. The actuating fluid is supplied to the cylinder on opposite sides of the piston through the medium of a valve including a valve chamber 24 which in this case is secured to the front part of the bed. Fluid is supplied from the pump (not shown) to the valve chamber under suitable pressure by a pipe 25 and is exhausted from the valve chamber by a pipe 26. The valve chamber has delivery connections to the cylinder 21 on opposite sides of the piston. These connections may be established in different ways, but in this instance by pipes 27 and 28 which are connected to passageways 27a and 28a respectively extending through the piston rod 22 and having outlets on opposite sides of the piston. The pipe 27 and passageway 27a are for the purpose of supplying motive fluid to give the slide a forward movement, and the pipe 28 and passageway 28a supply the fluid to the cylinder for causing the return movement of the slide. It will be understood that when the fluid is being supplied by the pipe 27 and passageway 27a to one side of the piston, the fluid is being exhausted from the other side by way of passageway 28a and pipe 28, and when fluid is supplied to actuate the slide by way of pipe 28 and passageway 28a to the other side of the piston, the pipe 27 and passageway 27a exhaust the fluid from the opposite side of the piston.

The valve chamber consists of a main body in which a cylindrical bore is formed for the movable valve member, the ends of the bore being closed by end plates 24a, one having a suitable stuffing box formed thereon. Slidable endwise in the bore of the valve chamber is a movable valve member 24b which, as here shown, has two cylindrical end portions connected by a reduced skeleton portion, the cylindrical portions being adapted to cover and uncover ports in the cylindrical bore of the valve chamber, which ports communicate with the delivery and exhaust pipes 27 and 28, see particularly Figs. 3 and 4. This valve member, which is designed to have endwise horizontal movement in the chamber, has connected to it a valve rod 29 which extends through the stuffing box referred to, and this valve rod is connected in this instance by a lost motion connection 30 to the end of the control slide 31 of the control unit, including a housing 32 which is bolted or otherwise secured to the bed 15 forwardly of the valve 24 and adjacent thereto. This control unit, which involves the principal features of the present invention, will be described presently.

It is customary in turret lathes to provide a so-called stop roll with a series of adjustable stops thereon to positively stop the forward movement of the turret slide at the completion of the cutting operation. This stop roll is usually in the form of a polygonal drum having as many faces as there are faces on the turret and the stops for the different cycles of movement of the slide are secured to the different flat faces of the stop roll. In this instance I use the usual stop roll, the same being illustrated in Figs. 3 and 4 at 33, this stop roll being supported by and movable with the slide 17. It is connected with the turret by any suitable gearing 34 (Fig. 4) so that the roll will be given a step-by-step rotation each time the turret is indexed. The stops which are adjustably mounted on the roll are shown at 35, one of these stops at the end of each forward motion of the slide coming into contact with a suitable fixed stop indicated at 36 in Figs. 3 and 4, this stop being integral with or secured to the bed.

The stop roll 33 is in keyed relation with a shaft 37 which is supported by the bed between the ways 16 and extends forwardly from the rear end thereof to near the forward end where, in this instance, it is provided with a cam drum 38 adapted to rock a gear shifting lever 39 to be referred to presently.

In addition to this stop roll I provide a second roll 40 which I term the cam roll which is also polygonal in form having the same number of faces as there are faces on the turret and faces of the polygonal stop roll. On each face of the cam roll are mounted two cams 40a and 40b and on each face except one is mounted a third cam 40c. This cam roll is supported on the front side of the machine forwardly of the bed 15 and moves back and forth with the slide 17, being mounted on a shaft 41 supported in bearings, one formed in a downwardly projecting arm 17a at the front part of the slide and the other in an enlargement 17b at the rear end of the slide. This cam roll is indexed by the indexing of the stop roll, these two rolls being connected by one-to-one ratio gearing designated as a whole by the reference character 42, this gearing including a gear on the rear end of the stop roll, a gear at the rear end of the cam roll and intervening idler gears. These gears are enclosed in a housing 43, part of which is removed from Fig. 3. The cams 40a, 40b and 40c are all adjustably mounted on the different faces of the cam roll and the function of these cams will be explained presently.

Figures 6, 7:
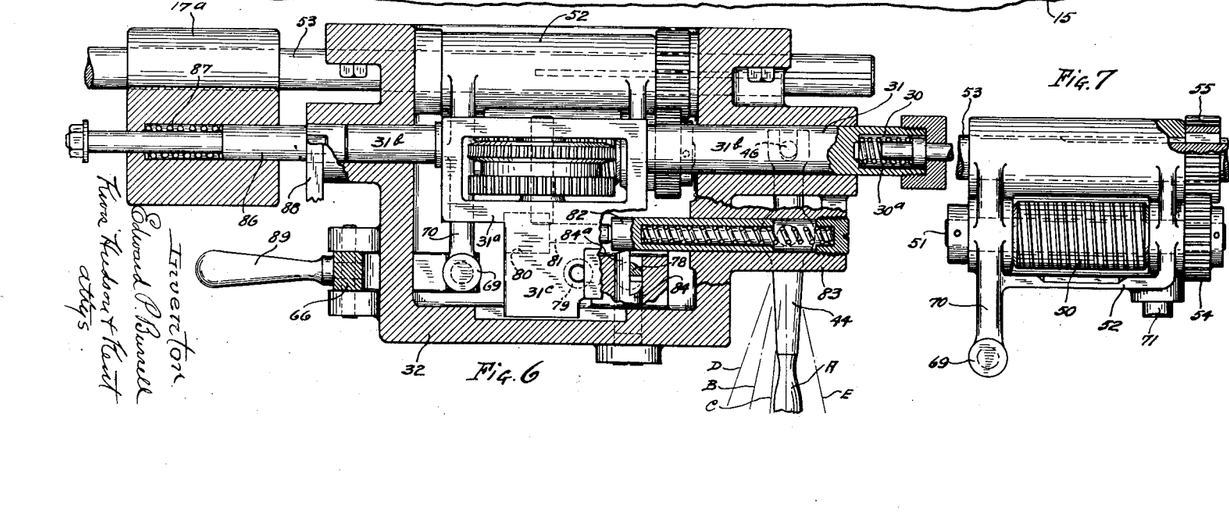
Fig. 6 is a horizontal section substantially along the line 6—6 of Fig. 5.
Fig. 7 is a detached view of the worm and worm housing forming a part of the differential mechanism used in the control of the hydraulically actuated slide.
Figure 8:
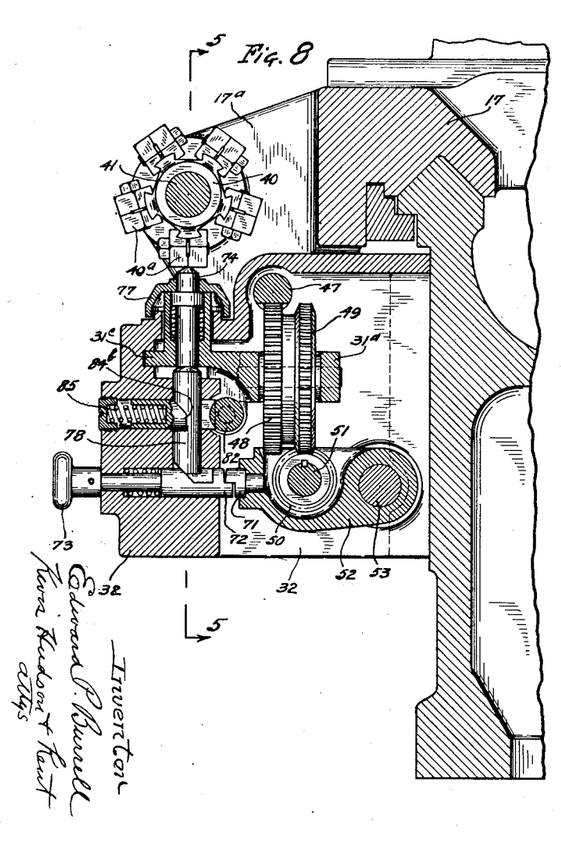
Fig. 8 is a fragmentary transverse sectional view substantially along the line 8—8 of Fig. 2.

Reverting again to the control unit of which the housing 32 is a part, it was mentioned that the movable valve member 24b has connected to it the valve rod 29 and that the latter is connected to a control slide 31 slidably supported for horizontal movement in the housing 32. The control unit includes also a control lever 44 which is pivotally mounted between a pair of ears 45 on the end of the housing 32 facing the valve 24. The lever is pivoted between its ends as shown in Fig. 3, the forward end of the lever projecting outwardly beyond the housing 32 and the rear end being forked and straddling a pin 46 carried by the control slide 31. It will be obvious that the operator may rock the lever back and forth and thus manually move the movable valve member 24b to control the supply of motive fluid to opposite sides of the piston and thereby cause the actuation of the slide 17 forwardly and rearwardly along the bed. This manual operation in a lathe of this kind is only desired at times, as, for example, when trial cuts are being taken, it being understood that for the normal operation of the lathe the valve is actuated automatically. Provision for full automatic operation is obtained by the control mechanism of this invention and also such actuation of the valve that the slide 17 is required to have a constant motion while in feed or during the relatively slow forward movement while the tools are cutting. As a part of my improved control, I use a differential mechanism including several gear elements, one of which is a rack 47 which is carried by the slide, the forward end of the rack being secured at 47a to the downwardly projecting portion 17a at the forward end of the slide and also extending through and having a bearing in the side walls of the housing 32 close to the bed 15. This rack at all times engages a spur gear 48 which rotates with and may be integral with a worm wheel 49 constituting a gear unit of the differential mechanism. This unit, composed of the gears 48 and 49, is supported by a pin carried by an enlarged portion 31a of the control slide, this enlarged portion having an opening which accommodates the gears, with side walls carrying the pin supporting the gears. The arrangement and manner of supporting these gears are best illustrated in Figs. 6 and 8. It will be noted that the slide 31 has at its ends two cylindrical extensions 31b which slidingly engage in bosses of the housing, and has a forwardly extending guide plate or tongue 31c which slidingly engages a slot in the front wall of the housing. In this way the slide is effectively supported.

By reference particularly to Fig. 8, it will be seen that the worm wheel 49 engages a worm 50 which is supported on a short shaft 51 in a rocking worm bracket 52 which is swingingly or rockingly supported on a shaft 53. By reference particularly to Fig. 7 it will be seen that the shaft 51 which carries the worm 50 has pinned or otherwise secured to it a spur gear 54 which meshes with a spur gear 55 which in turn is in keyed relation with the shaft 53, that is to say, the worm 50 is at all times rotated by the shaft 53 through the gears 54 and 55, but the arrangement is such that the bracket can be swung about the shaft 53 so as to allow the engagement of the worm 50 with the worm wheel when the bracket is in its upper position shown in Fig. 8, and to permit their disengagement when the bracket is swung downwardly from the position shown in Fig. 8 to the position shown in Fig. 10.

Figure 5:
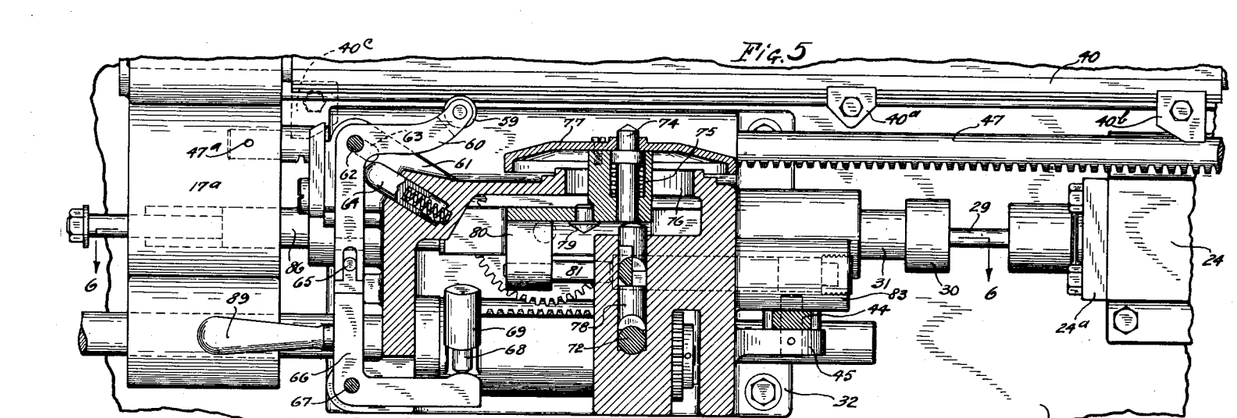
Fig. 5 is an enlarged side elevation, with certain parts in section, substantially on the line 5—5 of Fig. 8.
Figure 9:
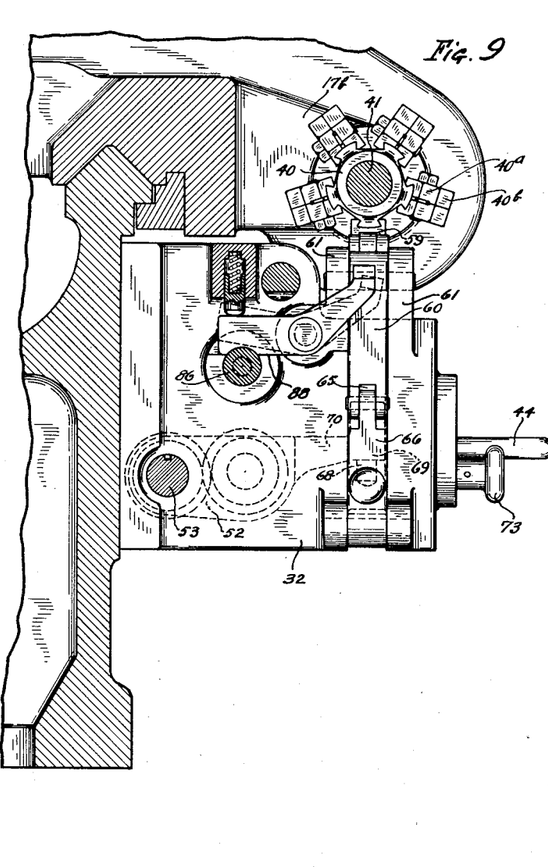
Fig. 9 is a fragmentary sectional view substantially along the line 9—9 of Fig. 2.

The shaft 53 extends along the front side of the bed 15 and at its forward end has a geared connection with the work spindle, inasmuch as it is desired that this shaft be rotated at all times by and in predetermined relation with the work spindle 19. It may not be necessary that the rate of rotation of the shaft 53 be varied with reference to the rate of rotation of the work spindle, but at times it may be desirable to vary the ratio, and to accomplish this change automatically. Accordingly, I provide at the forward end of the bed beneath the head a gear box 56 containing variable speed gearing 57 which is connected by gearing 58 to the work spindle 19, the shaft 53 being driven from the work spindle by the gears 58 and by a pair of gears in the gear box. To change the ratio of these driving gears I utilize the shaft 37 which supports the stop roll, as already explained, with its cam drum 38 which in turn actuates the lever 39 the lower end of which is adapted to shift a sliding key or other shifter to render effective the different pairs of gears in the gear box. It will be seen from the above that when the worm 50 is in mesh with the worm wheel 49, during the movement of the slide, the slide will have a constant motion at a rate dependent upon the rate of rotation of the worm 50 for any variation in the movement of the slide from that permitted by the rotation of the worm 50 will, by the differential action, cause a slight forward or rearward motion of the control slide which carries the gears 48 and 49 and therefore a motion of the movable valve member such as to maintain the movement of the slide constant. This uniform motion of the slide is desired only when the slide is having its relatively slow forward feeding motion, and, accordingly, means is provided to bring about the engagement and disengagement at the proper times of the worm 50 and worm wheel 49. When the center line of the control lever 44 is in the position designated A indicated in Fig. 6, i. e., neutral position, the slide 17 is stationary. When the operator desires to start the machine in operation, he will move the control lever from neutral position or position A in Fig. 6 forwardly to position B indicated by the center line of the lever which is the rapid forward position. The slide will now start forwardly with its rapid motion until it reaches the position where the feed is to start, whereupon the worm bracket is automatically swung upwardly so as to engage the worm 50 with the worm wheel 49, the worm and worm wheel having been out of engagement during the rapid forward movement of the slide 17. This is accomplished by the following means. At the end of the rapid forward movement of the slide 17, one of the cams 40a of the cam roll 40 previously described (the cam roll moving with the slide, as already described) comes into engagement with a roller 59 on a bell crank 60 mounted in a pair of ears 61 at the upper lefthand corner of the housing 32 (see Figs. 5 and 9). This bell crank carries a pin 62 movable in diagonal slots 63 (Fig. 5) in the supporting ears 61 and normally the pin is held at the top of the slots, as shown in Fig. 5, by the engagement on the bell crank of a spring plunger 64. Accordingly, when the cam 40a engages and depresses the roller 59 by reason of this mounting of this bell crank, the bell crank will be rocked about the pin 62 without displacing its position in the slots 63. The lower arm of the bell crank is forked, as shown at 65, and has engagement with the upper end of the arm of a second bell crank 66 pivotally mounted on a pin 67 between ears at the lower lefthand corner of the housing 32, see Figs. 5 and 9. The rocking movement of the bell crank 62 therefore rocks the bell crank 66, elevating an arm of the latter bell crank which projects into the housing. The inner end of this arm engages a yieldable plunger 68 which is carried in a boss 69 on an arm 70 projecting forwardly from the worm bracket 52, the effect of this rocking of the bell crank 66 being to swing the worm bracket upwardly so as to engage the worm 50 with the worm wheel 49 or to rock it from the position shown in Fig. 10 to the position shown in Fig. 8. The spring plunger 68 or yieldable device between the bell crank arm 66 and the arm of the worm bracket is provided so that should the teeth of the worm wheel not immediately slide into engagement, the spring plunger can yield slightly, compressing the spring, and an instant later the compressed spring will slide the teeth of the two gears into full engagement. As soon as the worm bracket is swung upward as just explained, a shouldered pin 71 carried by the worm bracket hooks over a shoulder of a spring bolt or latch 72 which projects through the lower portion of the front wall of the housing and is provided at its outer end on the front of the housing with a knob 73. Obviously, the operator can at any time manually cause the disengagement of the worm 50 from the worm wheel 59 by pulling out on the knob 73, this movement freeing the shouldered pin 71 from the inner end of the bolt 72, allowing the worm bracket to drop to the position shown in Fig. 10, thus disengaging the worm from the worm wheel.

As soon as the engagement of the worm with the worm wheel is caused in this automatic manner by the action of the cam 40a on the bell crank 60, the differential mechanism becomes effective and the first result or action of this differential mechanism is to slow down the movement of the main slide to the feeding rate determined by the rate of rotation of the worm 50, and this is done by the worm 50 acting through the gears 49 and 48, together with the engagement of the gear 48 with the rack 47 to move the control slide 31 to the left so as to bring the center line of the control lever back from rapid forward position to feeding position C (Fig. 6) and of course to move the movable valve member 24b to the position wherein it allows enough motive fluid to pass to the cylinder to move it at the desired rate for feeding. Due to the continued differential action of these gears, the slide 17 moves at the predetermined constant rate throughout the feeding portion of its cycle, for any change in speed of the slide due to any of the causes previously mentioned over that permitted by the rate of rotation of the worm 50 will cause an endwise movement of the control slide 31 and a slight shifting of the control valve sufficient to maintain the movement of the slide 17 at a constant rate, the differential mechanism being so sensitive that in reality there is no actual or appreciable change in the rate of movement of the slide 17.

The feeding movement continues until the forward movement of the slide 17 is stopped by the engagement of one of the adjustable stops 35 on the stop roll 33 with the stationary stop 36. After the slide 17 comes to a stop, the return movement of the slide is not immediately initiated for it is desired that there be a predetermined dwell between the end of the feeding movement and the beginning of the rapid return movement of the slide to allow all spring to be taken out of the cutting tools. Accordingly, the worm 50 is not immediately disengaged from the worm wheel 48, and, therefore, since the rack 47 is now stationary during this dwell period), the effect of the differential mechanism is to move the control lever from the feeding position C (Fig. 6) somewhat to the left either toward, to or even beyond the rapid forward position B, depending upon the length of dwell desired. In Fig. 6 I have indicated at D the center of the lever in the approximate maximum dwell position which, as shown, is slightly beyond the rapid forward position. The movement of the lever in the lefthand direction indicated in Fig. 6 is accompanied by a movement of the control slide 31 to the right. In practice, the valve cannot be moved to the right beyond the position corresponding to the rapid forward position of the control lever as the end of the valve will come up against a stop at the end of the valve chamber, and any further movement of the control slide 31 beyond the point corresponding to the rapid forward position of the lever will simply compress a spring 30a, see Fig. 6, in the lost motion connection between the valve rod 29 and the control slide. After the predetermined dwell period has elapsed, the worm 50 is disengaged from the worm wheel 49 and the control slide is immediately moved to the left a sufficient distance to bring the center line of the control lever to the rapid return position indicated at E in Fig. 6, and these results are accomplished with the following mechanism.

When the slide 17 came to a stop at the end of its feeding movement, one of the cams 40b on the cam roll was close up to the upper end of a spring pin 74 (see particularly Fig. 5), this spring pin 74 being mounted in an upwardly projecting portion 75 of the control slide 31, this upwardly extending portion projecting through a slot 76 at the top of the housing 32. There is secured to the top of this upward extension 75 of the control slide a cover plate 77, the function of which is to keep dirt and other foreign matter out of the slot 76 and from the interior of the housing. The lower end of this spring pin engages the upper end of a cam bolt 78 which is mounted in vertical position in the forward part of the housing 32. The lower end of this cam bolt is tapered and engages a tapered shoulder of the spring bolt 72, the forward end of which, as previously explained, normally engages a shoulder pin 71 to keep the worm bracket elevated. During the dwell period, the spring pin 74 moving now to the right with the control slide, comes under and is depressed by the cam member 40b (which is now stationary since the cam roll 40 and slide 17 are now stationary) and at the end of the dwell period, the length of which depends upon the position of the cam 40b on the cam roll, the spring pin 74 has been depressed sufficiently to lower the cam bolt 78 and to move the spring bolt 72 outwardly sufficiently to disengage it from the shoulder pin 71 and allow the worm bracket to drop and disengage the worm from the worm wheel (see Fig. 10). It will be noted that the diameter of the cam bolt 78 is such that portions at least of the spring pin 74 and cam bolt 78 will be in alignment over a fairly large range of movement of the control slide so that the spring pin can operate with various adjustments of the cam 40b, but should the cam 40b not be in the right position to time the disengagement of the worm from the worm wheel by the action of the spring pin on the cam bolt, I have provided a safety device in the form of a dog 79 which is carried by the control slide to the left of the spring pin 74, this dog being so arranged that if the spring pin cannot function when depressed by the cam 40b to lower the cam bolt 78, this dog will engage the cam bolt 78 and depress it so as to cause the disengagement of the worm from the worm wheel. If the dog 79 brings about the disengagement of the worm from the worm wheel, the cycle of operations of the machine stops, thus indicating to the operator that the cam 40b was not adjusted to the proper position. This will be explained more fully below.

When the worm is disengaged by the lowering of the spring pin 74, as explained above, at the end of the dwell period, the rapid return movement of the slide is initiated, as stated, this being caused by the automatic movement of the control slide and valve such that the control lever is moved from position D to position E (see Fig. 6), the slide 31 and the valve then being moved to the left by the following means: The control slide has a downwardly projecting lug 80 carrying a laterally projecting pin 81 which is in line with and is adapted to engage the end of a spring bolt 82 mounted in a boss or barrel 83 forming a part of the housing 32. When the control lever was previously moved to the rapid forward position to initiate the cycle of movements, the control slide was of course moved to the right, and during this movement of the control lever and movement of the slide, the pin 81 moved the spring plunger inward, compressing its spring until a catch 84 snapped in front of the end of the spring bolt, and this retained it in its retracted position under the action of its associated spring 85 (see Fig. 8). This catch has two portions which should be described. One of these is the forward end 84a which engages in front of the spring bolt, as just stated, and the other portion is a camming shoulder 84b which, when the catch is in position to engage in front of the end of the spring plunger 82, lies in a cam notch of the cam bolt 78 (see Fig. 8). Accordingly, when the worm was disengaged from the worm wheel by the lowering of the spring pin 74 and cam bolt 78, the latter, by its action on the cam shoulder 84b, slides the catch outwardly, disengaging its inner end 84a from in front of the spring bolt (see Fig. 10), whereupon the spring bolt is quickly moved outwardly by its associated spring up against the pin 81 carried by the control slide and moves the control slide and the valve to the left, throwing the control lever to position E and causing the rapid reverse return movement of the slide 17.

At this point it might be stated that if the disengagement of the worm from the worm wheel is brought about by the action of the dog 79 on the cam bolt 78, the lowering of the cam bolt takes place naturally at a later time than it would take place if actuated by the lowering of the spring pin 74, and accordingly, the control slide will have moved further to the right and the spring bolt 82 would have been moved inward by the pin 81 a greater distance, i. e., beyond the end 84a of the catch, and when the worm was then released under the action of the dog 79, the catch 84 would come back in front of the spring bolt 82 so as to again restrain its movement and prevent it from moving the control slide to the position corresponding to the rapid return position E of the control lever. Accordingly, the main slide remains in its forward position, thus indicating to the operator that the machine was not originally set up properly in so far as the location of the cams 40b is concerned.

Near the end of the rapid return movement of the slide, the turret is indexed, and the indexing of the turret at the same time indexes the stop roll and cam roll, and when the slide 17 reaches the end of its return movement for all except the last cycle of the series, the slide is automatically started forwardly on this rapid forward movement, and this is accomplished by the following means.

The downward extension 17a of the slide 17 carries a spring bolt 86, see particularly Fig. 6, which is acted on by a spring 87 which is stronger than the spring associated with the spring bolt 82, this spring bolt being in line with an extension at the lefthand side of the slide 31, as clearly shown in Fig. 6. There is also provided on the end of the stationary housing 32 facing the extension 17a of the slide 17 a pivoted latch 88 (see particularly Fig. 9) which is so arranged that one end of this catch will engage in front of and move the spring plunger 86 inward during the latter part of the rapid return movement of the slide 17. During the last portion of the return movement of the slide 17 (for all cycles except the last of the series), one of the cams 40c of the cam roll 40 engages the outer end of the latch 88, removing its inner end from in front of the spring plunger 86, allowing the spring 87 to move the control slide 31 to the right as the same is viewed in Fig. 6, thus moving the valve to its rapid forward position and moving the control lever from position E to position B. In so doing, the spring plunger 82 is moved inward against the action of its spring, and the inner end 84a of the catch 84 moves in front of the end of the plunger and holds it in its retracted position so that it may function at the end of the dwell period to move the control slide in the opposite direction. The cams 40c are provided on all but one of the faces of the cam roll, this face corresponding to the last cycle of the series of movements of the slide 17. Accordingly, at the end of the last cycle, the catch 88 is not withdrawn from in front of the spring bolt 86, with the result that when the slide comes to the end of its return movement all parts are stopped by the end of the cylinder 21 engaging the end of the stationary piston 22 with the valve left standing in its position corresponding to rapid return. After a new work piece has been placed in the machine, the operator can initiate a new cycle by manually moving the control lever from rapid return position to rapid forward position or when the slide came to a stop at the end of its return movement in the last cycle of the series, the operator may relieve the oil pressure in the cylinder by moving the control lever from rapid return position to neutral position.

It was previously stated that at any time during the feeding movement of the slide, the operator may pull out the knob 73 so as to cause the disengagement of the worm 50 from the worm wheel 49, and can then manipulate the control lever manually, as desired. He can also manually cause the engagement of the worm with the worm wheel at any time desired by rocking the bell crank 66 which is shown provided with a hand lever 89 for that purpose.

It will thus be seen that I have provided a hydraulic operating system for the movable member of a machine tool, such as the slide of a turret lathe, with a control therefor which renders the machine automatic to the same extent as though the movable member were actuated mechanically, and at the same time a constant feeding movement of the hydraulically actuated member is insured with mechanism which has the features of durability and reliability, and with provision for stopping the automatic operation at any time and control the hydraulically actuated movements of the member through manual control of the valve supplying motive fluid to the actuating motor.

While I have shown one form of my invention, the same being applied to a lathe, it will be understood that the mechanism may be modified in many particulars and that it may be applied to other types of machine tools than turret lathes. Furthermore, my invention need not be applied to the turret slide or to a slide which moves along the ways of the bed toward and from the work spindle. On the other hand, it may be applied without difficulty to any other slide of the machine tool, such as the cross-slide, and, if desired, it may be applied to two or more slides, such as the turret slide and the cross-slide. The application to two slides will involve substantially only a duplication of much of the mechanism herein illustrated, with two valves, an additional operating cylinder, and two control units, but a single power shaft may be utilized for both control units. I therefore aim in my claims to cover all modifications and adaptations which do not involve a departure from the spirit and scope of my invention.

Having thus described my invention, I claim:

1. A machine tool having a movable member, hydraulic means for actuating it including a hydraulic motor and a control valve therefor, means for controlling said movable member and for insuring a constant motion for feeding purposes including a power shaft a rack connected to said movable member and differential gearing having a connection with said shaft, rack and valve and including a bracket carrying one of said gears and supported on said power shaft for rocking movement to cause the gear carried thereby to engage another of said gears.

2. A machine tool comprising two movable members, hydraulic means for moving one of said members relative to the other including a hydraulic motor and a control valve therefor, means for actuating said valve and for insuring a constant movement of said hydraulically actuated member for feeding purposes including a rack connected to said member, a power shaft connected to the other member, differential gearing between the rack and the power shaft including two engageable and disengageable gears, and a support for one of said gears mounted on the power shaft for rocking movement.

3. A machine tool comprising two movable members, hydraulic means for moving one of said members relative to the other including a hydraulic motor and a control valve therefor, means for actuating said valve and for insuring a constant movement of said hydraulically actuated member for feeding purposes including a rack connected to said member, a power shaft connected to the other member, differential gearing between the rack and the power shaft including two engageable and disengageable gears, a support for one of said gears mounted on the power shaft for rocking movement, and means controllable both manually and automatically for moving said support to engage and disengage said gears.

4. In a machine tool, a spindle, a slide movable relative to the spindle, hydraulic means for actuating the slide, a control valve for said means, a control slide, means comprising a differential for controlling and actuating the control slide and the valve and including a rack connected to the first mentioned slide, a power shaft driven in predetermined relation with the spindle, gears connected to said rack and shaft, and a rocking bracket supported on said power shaft carrying one of the gears and movable to engage and disengage said gears.

5. In a machine tool, a spindle, a slide movable relative to the spindle, hydraulic means for actuating the slide including a hydraulic motor and a valve therefor, means including differential mechanism having a part connected to said slide, spindle and valve for insuring a constant feeding motion for the slide, a cam roll, and cams thereon for throwing said differential into action to initiate the feeding movement and for throwing it out of action for the rapid return movement of the slide.

6. A machine tool comprising a spindle, a slide, hydraulic means for imparting feed and rapid return movements to the slide including a hydraulic motor and a control valve therefor, differential means for automatically actuating the control valve during the feeding movement with a predetermined dwell between the feed and return movements, and means comprising a cam roll and cams thereon for initiating the feeding movement and for initiating the rapid return movement and for controlling the length of the dwell.

7. In a machine tool, a movable member, hydraulic means for actuating it including a hydraulic motor and a valve therefor, automatic means connected to the valve, for insuring a constant motion for said member during at least a portion of its movement, including engageable and disengageable gears, a shifting device for actuating the valve when the gears are disengaged, a restraining member therefor, a holding member for retaining said gears in engagement, and an automatic actuating element controlling both the restraining member and said holding member.

8. In a machine tool, a movable slide, hydraulic means for actuating the slide including a hydraulic motor and a valve therefor, means connected to the valve for automatically shifting the same and for controlling its movements and for insuring a constant movement for feeding purposes including gearing relatively engageable and disengageable, a plunger for actuating the valve when the gears are disengaged, a latch for the plunger, a latch holding the gears in engagement, and a common actuator for the two latches.

9. In a machine tool, a spindle, a slide, hydraulic means for moving the slide relative to the spindle including a source of fluid supply, a motor, and a control valve, means including gearing having a connection with the spindle, a connection with the slide, and a connection with the valve, a device for maintaining or interrupting the connection of said gears with the spindle, spring means for shifting the valve when said connection with the spindle is interrupted, a device for restraining said spring means, and a common actuator for both of said devices.

10. In a machine tool, a spindle, a slide, hydraulic means for moving the slide relative to the spindle including a source of fluid supply, a motor, and a control valve, means including gearing having a connection with the spindle, a connection with the slide, and a connection with the valve, a device for maintaining or interrupting the connection of said gears with the spindle, spring means for shifting the valve when said connection with the spindle is interrupted, a device for restraining said spring means, a common actuator for both of said devices, and an automatically actuated cam means for shifting said actuator.

11. In a machine tool, a spindle, a main slide, hydraulic means for moving it relative to the spindle at varying speeds including a source of fluid supply, a motor, a control valve, a control slide connected thereto, gearing having a connection with the spindle, with the main slide and with the control slide, for insuring constant motion of the main slide for feeding purposes, spring means acting on control slide to shift it in opposite directions, a device for maintaining the connection between said gearing and the spindle so that when actuated the connection will be disestablished, a device for restraining one of said spring means against movement until said connection is disestablished, a common actuator for both said devices, and cam means operating in timed relation with the movements of the main slide for causing said connection with the spindle to be established at one point in the cycle of movement of the slide, for causing said actuator to be shifted to disestablish said connection and shift the control slide in one direction, and for releasing the other of said spring means to shift the slide in the opposite direction.

12. In a turret lathe, a spindle, a turret slide having a tool holding turret, hydraulic means for actuating the turret slide including a hydraulic motor, a control valve therefor whereby the turret slide may be moved through a series of cycles one for each face of the turret, each cycle including a feeding movement, a return movement, and a dwell period between said movements, differential control means for moving said valve during the dwell period from the feeding position in the direction of the rapid forward position, and means including a cam roll adapted to be indexed with the turret having means for controlling the valve movement and the timing of the dwell periods of the different cycles.

13. In a turret lathe, a spindle, a turret slide having a tool holding turret, hydraulic means for actuating the turret slide including a hydraulic motor and a control valve therefor whereby the turret slide may be moved through a series of cycles one for each face of the turret, each cycle including a feeding movement, a return movement, and a dwell period between said movements, control means for moving said valve during the dwell period from the feeding position in the direction of the rapid forward position, and means including a cam roll adapted to be indexed with the turret and having adjustable cams for controlling the valve movement and the timing of the dwell periods of the different cycles.

14. In a machine tool, a slide, hydraulic means for actuating the slide, power means for insuring a constant movement of the slide including engageable and disengageable members, an adjustable device for timing the disengagement of said members, and a safety device for insuring their disengagement in the event the adjustable device fails to function.

15. In a machine tool, a slide movable in opposite directions and adapted to be automatically stopped after a predetermined number of cycles, hydraulic means for actuating the slide, a control valve associated therewith, power means including engageable and disengageable members for insuring a constant feed movement of the slide during a portion of each cycle, a plurality of devices one for each cycle for causing the disengagement of said members at the end of each feed movement, and additional means for insuring the disengagement of said members if any one of said devices in the different cycles of movement fails to function.

16. In a machine tool, a slide movable in opposite directions and adapted to be stopped after a predetermined number of cycles, hydraulic means for actuating the slide, means including engageable and disengageable members for insuring a constant feed movement of the slide in each cycle, a plurality of devices one for each cycle for causing the disengagement of said members at the end of each feed movement, and means for stopping the cycle if any one of said devices corresponding to any cycle fails to function.

17. In a machine tool, a rotary spindle, a slide movable in opposite directions relative to the spindle, hydraulic means for actuating the slide, means connected with the spindle and comprising engageable and disengageable members for insuring a constant feed for the slide, a member having a plurality of adjustable devices for causing the disengagement of said members at the end of each feeding movement, and means for insuring the disengagement of said members if any one of said devices fails to function by improper adjustment.

In testimony whereof, I hereunto affix my signature.

EDWARD P. BURRELL.